July 18, 1967 H. D. MORRIS 3,331,253
ACCELEROMETER AND SENSING ASSEMBLY THEREFOR
Filed Aug. 5, 1963 3 Sheets-Sheet 2

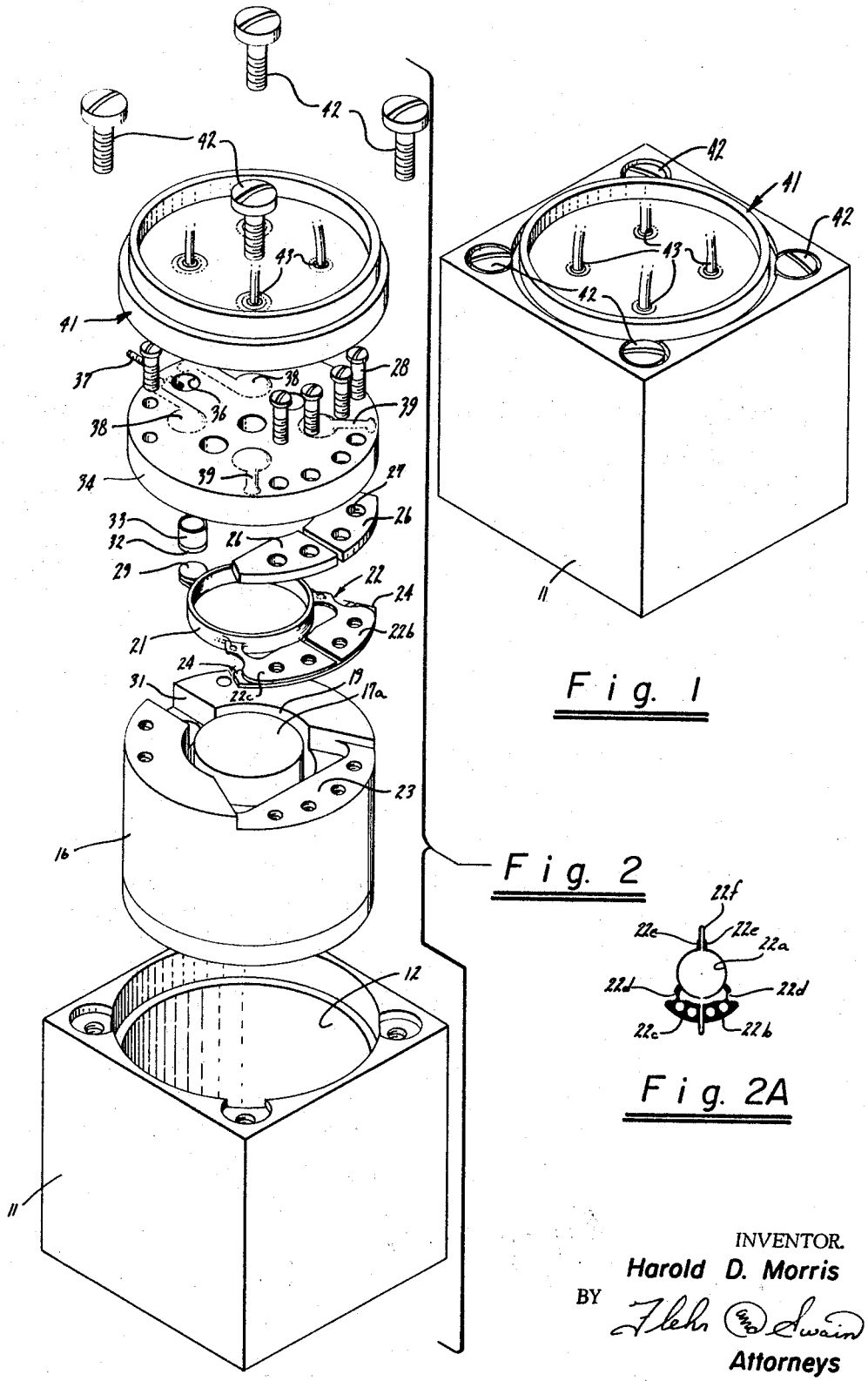

INVENTOR.
Harold D. Morris
BY
Attorneys

INVENTOR.
Harold D. Morris
BY
Attorneys

United States Patent Office 3,331,253
Patented July 18, 1967

3,331,253
ACCELEROMETER AND SENSING ASSEMBLY
THEREFOR
Harold D. Morris, Orinda, Calif., assignor to Systron-Donner Corporation, Concord, Calif., a corporation of California
Filed Aug. 5, 1963, Ser. No. 299,759
10 Claims. (Cl. 73—517)

This invention relates to an accelerometer and sensing assembly therefor and more particularly to an accelerometer and sensing assembly therefor which is particularly useful in high G and low G ranges.

At the present time there are available on the market many different types of accelerometers. However, in certain accelerometers, changes in linearity have occurred because of shifting of the point about which the pendulous mass moves. There is therefore a need for a new and improved accelerometer and sensing assembly for use therewith.

In general an object of the present invention is to provide an accelerometer and sensing assembly therefor which has a very high G range and a low G range.

Another object of this invention is to provide an accelerometer and sensing assembly therefor which has unusually high environmental resistance.

Another object of this invention is to provide an accelerometer and sensing assembly therefor which is rugged, reliable and long lived.

Another object of the invention is to provide an accelerometer and sensing assembly therefor in which the center of force coincides with the center of the mass of the moving system.

Another object of the invention is to provide an accelerometer and sensing assembly therefor which has a very high torque level about the true pivot axis.

Another object of the invention is to provide an accelerometer and sensing assembly therefor which has an extremely high strength and ruggedness.

Another object of the invention is to provide an accelerometer and sensing assembly therefor which is capable of of extremely precise measurements.

Another object of the invention is to provide an accelerometer and sensing assembly therefor which has a minimum amount of mass in the moving system.

Additional objects and features of the invention will appear from the following description in which the preferred embodiments are set forth in detail in conjunction with the accompanying drawings.

Referring to the drawings:

FIGURE 1 is an isometric view of a sensing assembly for an accelerometer incorporating my invention.

FIGURE 2 is an exploded view of the sensing assembly shown in FIGURE 1.

FIGURE 2A is a top plan view of the flexure used in the sensing assembly shown in FIGURES 1 and 2.

Figure 3:
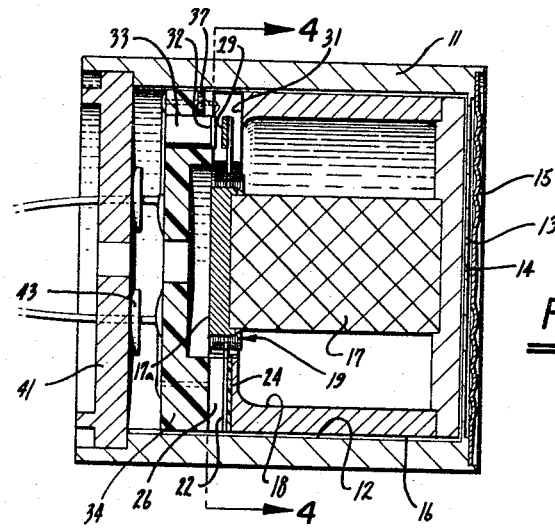
FIGURE 3 is a cross sectional view of the sensing assembly shown in FIGURES 1 and 2.
Figure 4:
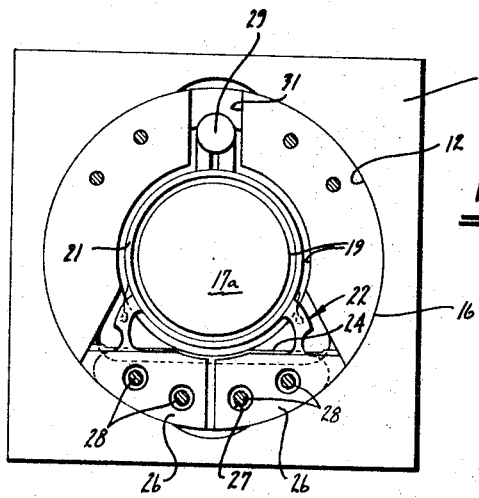
FIGURE 4 is a cross sectional view taken along the line 4—4 of FIGURE 3.

The sensing assembly shown in FIGURES 1–4 for use in my accelerometer consists of an outer case 11 of suitable configuration such as the rectangular shape shown in the drawings which is provided with cylindrical bore 12. The case 11 is designed so that the entire assembly can be filled with a minimum volume of oil. Means is provided to accommodate the expansion and contraction of the oil due to temperature changes and consists of a bottom plate 13 mounted in the case 11 and which is provided with a small opening 14 to permit oil to pass from the bore 12 through the opening 14 and into and out of the space provided between a flexible diaphragm 15 and the plate 13.

A cylindrical magnet housing 16 is removably mounted in the bore 12 and is formed of a suitable material such as soft iron so as to carry magnetic lines of flux. A cylindrical permanent magnet 17 of suitable material such as "Alnico" is mounted in the substantially cylindrical bore 18 provided within the magnet housing 16 in a suitable manner such as by the use of an epoxy cement or solder. The magnet 17 is provided with a soft iron pole piece or cap 17a which is also substantially cylindrical to cause magnetic lines of flux to cross an annular air gap 19 formed between the pole piece 17a and the magnet housing 16. As can be seen particularly in FIGURES 2 and 3, the cap 17a is substantially flush with the upper portion of the magnet housing so that the annular air gap 19 is substantially parallel to the vertical axis of the cylindrical magnet housing 16.

A moving system is mounted in the magnet housing and consists of an electro-magnetic torque coil or restoring coil 21, which is disposed within the annular air gap 19. Means is provided for mounting the coil to permit angular movement of the coil 21 in a direction parallel to the longitudinal axis of the cylindrical magnet housing 16 and consists of a planar flexure member 22 which is formed of very thin spring-like planar sheet of material. The flexure member can be made of any suitable material such as beryllium copper. If desired, it can be of either nonmagnetic or magnetic material. However, the material should be relatively stable with regard to temperature changes. The flexure member 22 is provided with an annular portion 22a (see FIGURE 2A). The torque coil 21 is fixed in a suitable manner such as by gluing equal upper and lower portions of the torque coil 21 to opposite sides of the annular portion 22a of the flexure 22. The flexure is provided with base portions 22b and 22c which are connected by necked or leg-like portions 22d to the portion 22a. The portions 22b and 22c are mounted in a recess 23 provided in the magnet housing 16. The portions 22b and 22c are insulated from the magnet housing by a strip 24 of a suitable insulating material such as a plastic strip. The portions 22b and 22c are then clamped in place by clamping members 26 which are secured to the magnet housing 16 by suitable means such as cap screws 28. The screws have a diameter less than the holes 27 in the members 26 (see FIGURE 4) to prevent any shorts.

It will be noted that portions 22d are spaced approximately 120° apart. Additional portions 22e are provided which are also spaced approximately 120° from the portions 22d. After the two sections of the torque coil have been cemented to the semi-annular portions 22a, portions 22f which join the two halves of the flexure are cut away to provide two separate conducting members to which the two wires leading to the torque coil are connected to make it possible to supply restoring current to the coil and thereby eliminating the need for hairsprings.

A pendulous element 29 is secured to the portions 22e of the flexure member 22 and is preferably insulated from only one of the portions 22e by suitable means such as a strip of plastic so that the two separate portions of the flexure member can serve as conducting members as hereinbefore described and also so that the element 29 will not pick up a static charge independent of the other parts of the moving system.

From the foregoing description, it can be seen that a symmetrical support has been provided for the torque coil 21. This makes it possible to obtain a relatively uniform magnetic field for the torque coil 21. The magnetic field is only interrupted by recesses formed in the magnet housing which are spaced 120° apart. The leg-like portions 22d in the cut-out 23 are spaced 120° apart and the portion 22e carrying the pendulous element 29 is disposed in a recess 31 and is spaced 120° from the leg-like portions 22d. Because of this symmetrical arrangement, there is essentially no reaction on the flexure member 22 for any value of input force within maximum servo capability along the sensitive axis of the sensing assembly, which is coincident with the center of the magnet housing 16.

In order to reduce the mass of the moving system as much as possible, the parts of the moving system i.e., the coil 21, the flexure 22 and the pendulous element are designed so that they are very light. For example, instead of using copper wire for the torque coil 21, it is preferable to use a lighter wire such as aluminum to thereby reduce the weight of the moving system. The mass can be further reduced by the floatation in fluid of a selectable density where high density would produce a minute effective mass and high G range. Ruggedness is improved in proportions.

Means is provided for sensing the position of the pendulous element 29 and consists of an inductive pickoff element 32 in the form of a pair of coaxial pickoff coils of the type described in Patent 3,074,279 which are mounted upon a cylindrical slug 33. The cylindrical slug 33 can either be mounted in the magnet housing 16 or in an insulating block 34 in a hole 36 and retained therein in a desired position by suitable means such as a set screw 37. The pickoff coils have their lead in wires connected to printed circuit elements 38 provided on the board or block 34. Similarly, printed circuit elements 39 are provided on the board 34 and are connected to the wires for the torque coils 21 through the clamping plates 26 and to the portions 22b and 22c of the flexure member 22.

A cover plate 41 is mounted over the printed circuit block 34 and serves to provide an oil-tight closure for the accelerometer case 11. The cover 41 is secured to the case 11 by suitable means such as cap screws 42, which are threaded into the case and engage the side margins of the cover. Terminals 43 are provided in the cover and engage the printed circuit portions 38 and 39 hereinbefore described or wires attached thereto. If desired the space between the magnet 17 and the magnet housing 16 can be filled with a suitable non magnetic material such as plastic or aluminum to minimize the amount of oil required to fill the sensing assembly.

Figure 5:
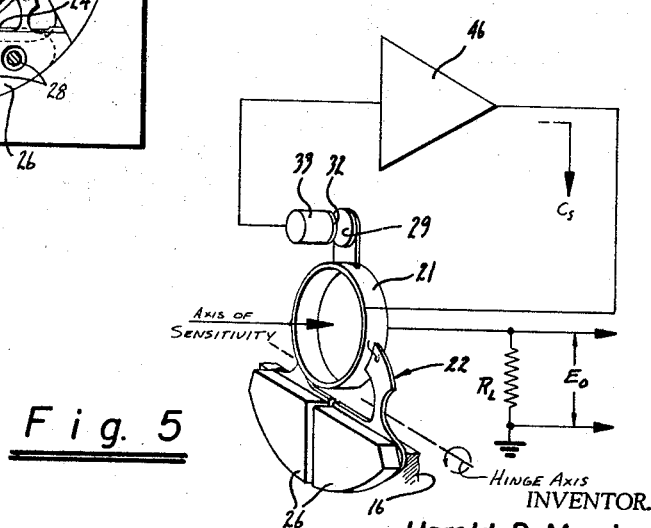
FIGURE 5 is a schematic illustration of an accelerometer incorporating my invention utilizing the sensing assembly shown in FIGURES 1 and 4.

The mode of operation of the sensing assembly shown in FIGURES 1–4 when incorporated in an accelerometer can be more easily understood by referring to FIGURE 5 in which the moving system is shown clamped between two blocks representing the manner in which the flexure member is clamped between the plates 26 and the magnet housing 16.

With the exception of the sensing assembly, the accelerometer shown in FIGURE 3 is very similar to that described in Patent No. 3,074,279. The sensing assembly which is shown in FIGURES 1 through 5 forms part of an accelerometer as shown schematically in FIGURE 3 in which the pickoff coils 32 are connected to electronics of the type described in Patent No. 3,074,279 and represented by the amplifier 46 which has its output connected to the restoring coil.

As pointed out in Patent No. 3,074,279 the accelerometer operates in a closed loop servo mode as a torque balancing device wherein torques due to action of acceleration are sensed and counterbalanced by servo produced torques. As shown in the diagram in FIGURE 5, the moving system is primarily comprised of the torque coil 21 and the pendulous element 29, mounted on the flexure 22 which permits movement about an axis coincident with a line passing laterally through the leg-like portions 22 of the flexure 22 (called hinge axis) while preventing motion in all other directions. Thus the moving system forms a pendulous mass. The inductive pickoff element 32 senses deviations of the pendulous element or member 29 from a neutral or null position and produces a signal for the electronics as represented by the amplifier 46 which is amplified to produce an output in terms of D.C. voltages directly proportional to the position error and changing sign as the error changes polarity. As described in Patent No. 3,074,279, when the electronics is connected to produce a current flow through the torque coil with correct phasing, a closed-loop servo is formed which acts to resist deflections of the pendulous element away from the null position.

By way of example, upon acceleration of the accelerometer, the pendulous element will deflect minutely and the servo will act to produce just sufficient output current to counterbalance the torque produced by acceleration. With resistor $R_L$ in series with the torque coil and the electronics, a servo output voltage $E_o$ will be produced which is directly proportional to the acceleration input. This is true for any value of acceleration limited on the lower end only by the ability to discern the signal through noise and on the high end by the maximum capability of the servo in producing torque.

As also pointed out in Patent No. 3,074,279, the electronics 46 consists primarily of an oscillator, a detector, and an output D.-C. amplifier. As described in Patent No. 3,074,279, the level of oscillation of the oscillator is varied by motion of the mass, i.e., the pendulous element 29. The frequency of oscillation is conveniently high, on the order of several megacycles, so that component values are small; however, since only amplitude changes are utilized, the actual operating frequency is unimportant.

The output amplitude of the oscillator is detected to produce a D.-C. control signal to operate the amplifier which in turn provides a high level D.-C. output $i_s$ to the series combination of the torque coil 21 and the load resistor $R_L$. Full scale capability of the servo is determined by the maximum output current of the output amplifier to the load circuit.

Thus it can be seen that in general principles, the accelerometer shown in FIGURE 5 operates in the same manner as the accelerometers disclosed in Patent No. 3,074,279 in that the accelerometer operates in a closed loop servo mode as a torque balancing device, wherein torques due to the action of acceleration are sensed and counterbalanced by servo produced torques.

As hereinbefore explained, the moving system is completely symmetrical about the axis of sensitivity for the sensing assembly, which is coincident with the axis for the torque coil 21. As also hereinbefore explained, the moving system has a very small mass. Because of this fact, the flexure support member 22 provides great ruggedness and environmental resistance and is particularly adaptable for use as an ultra-high G unit.

By way of example, I have found that I have been able to servo an accelerometer constructed in accordance with present invention to 800 G and to accommodate cross axis input accelerations of greater than 1,000 G with the possibility of surviving 10,000 G applied on the cross axis. The ability to withstand such very high cross axis input acceleration is due to the fact that the flexure member 22 is very sturdy in this direction and must be sheared before failure will occur.

The sensing assembly shown in FIGURES 1 through 4 is also very sensitive because the pendulous mass 29 is disposed at a point of maximum distance from the pivot point.

From the foregoing description it can be seen that all unnecessary mass of the moving system has been eliminated so that extreme environments can be sustained without damage. The use of aluminum in the torque coil also makes it possible to achieve a remarkably minute mass which in the sensing assembly shown in FIGURES 1 through 5 is submerged in oil. Thus when compared with conventional units, my new and improved sensing assembly for use with accelerometers has much smaller suspended mass and a much greater area for support. Because of the high cross sectional area, tension and compression forces introduced into the accelerometer during high G accelerations do not even begin to approach significant values and will generally cause stresses which are only a small percentage of the yield strength of the material of the flexure even at the points of highest stress.

With the geometry shown in FIGURES 1 through 4 an acceleration perpendicular both to the pendulous element and the sensitive axis will produce stresses approximately 50% higher than the same level of acceleration applied along the line of the pendulous element. This stress and shear, however, is not objectionable because again stresses will reach only a small percentage of the yield strength of the flexure.

Calculation shows that the flexure will not fail due to "thin column" collapse by bending, since this can only occur at accelerations even higher than those necessary to produce simple compressional failure, thereby eliminating this possible mode of failure.

Also stresses due to vibration and overload accelerations along the sensitive axis can be readily accommodated by the sensing assembly. With the arrangement shown, under no conditions can stresses on cross axis be normally generated which are a serious percentage of the material strength.

The accelerometer hereinbefore described has a specific point about which it can be angularly accelerated without producing an output. This point is near the center of the pendulous element 29. In order to utilize the maximum sensitivity of the accelerometer, it is necessary that the accelerometer be properly aligned and positioned about this point so that the output from the accelerometer is due solely (ideally) to desired inputs. Since vehicles accelerating rapidly are also apt to have rapid angular motions of pitch, roll and yaw, signals may appear due to these motions if the accelerometer can sense the tangential or centripetal accelerations. Sensitivity to such signals as well as lateral linear accelerations may be other than the desired zero if perfect alignment of the accelerometer is not obtained.

Figure 6:
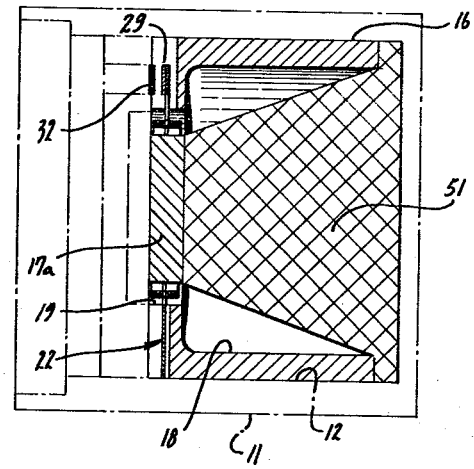
FIGURE 6 is a cross sectional view similar to FIGURE 3 showing another embodiment of my sensing assembly.

In FIGURE 6 I have shown another embodiment of my sensing assembly. This sensing assembly is very similar to that shown in FIGURES 1, 2, 4 and 5, with the exception that the magnet 51 is conical in shape rather than cylindrical. By utilizing a larger magnet, the magnetic field in the annular air gap is increased to cause the torque per unit current to be proportional and larger. This will make it possible to use sensing assembly in accelerometers for sensing high G levels in direct proportion to the increase in the magnetic field. The operation of this sensing assembly is substantially identical to that of the sensing assembly hereinbefore described.

Figure 7:
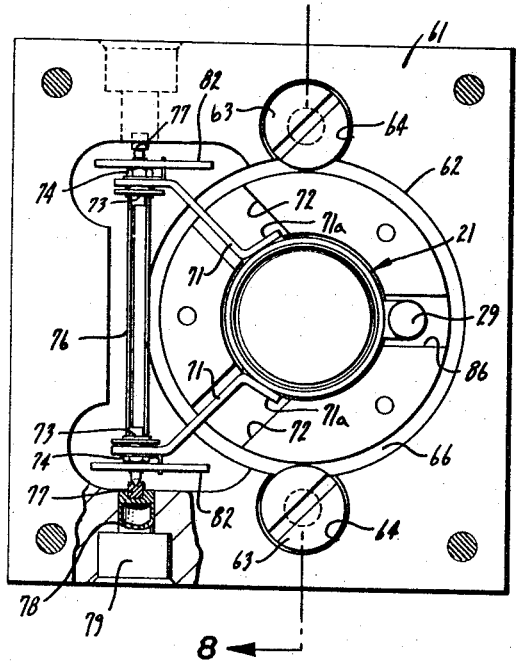
FIGURE 7 is a top plan view of still another sensing assembly incorporating my invention.
Figure 8:
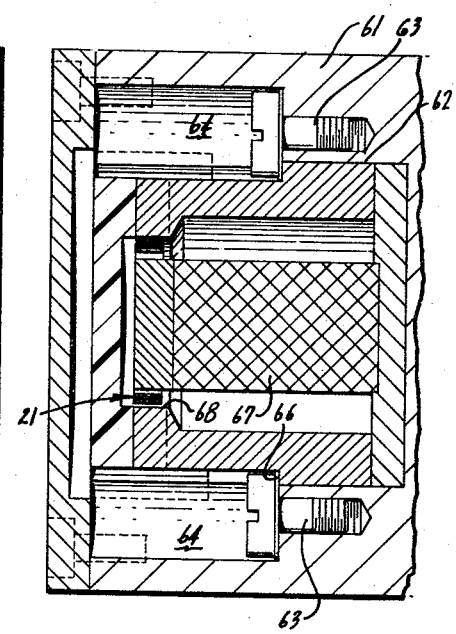
FIGURE 8 is a cross sectional view of the sensing assembly shown in FIGURE 7.

In FIGURES 7 and 8 there is shown another embodiment of a sensing assembly incorporating my invention which includes low friction pivot means for mounting the moving system so that the sensing assembly will be more sensitive to low G accelerations. An outer case 61 similar to the case 11 is provided. A cylindrical magnet housing 62 is disposed within the outer case 61 and is secured thereto by suitable means such as screws 63 which are disposed in recesses 64 provided in the outer case 61 and engaging shoulders 66 provided on the cylindrical magnet housing 62. A cylindrical magnet 67 is mounted within the magnet housing 67 and an annular air gap 68 is formed in which a torque coil 21 of a type similar to that hereinbefore described is disposed. A pendulous mass 29 is secured to the torque coil 21 in the same manner as in the embodiments hereinbefore described. The pendulous mass 29 is disposed in another recess 86 which is removed approximately 120° from the recess 72 provided in the magnet housing.

Means is provided for supporting the torque coil and consists of a pair of truss members 71 which are disposed symmetrically in spaced cut-outs 72 provided in the magnet housing 62 and which have portions 71a thereof which are secured to the torque coil 21 by suitable means such as cement. The other ends of the truss members are secured to low friction pivot means consisting of a pair of pivot members 73 by suitable means such as nuts 74. The pivot members 73 are connected by a tube 76. Suitable means such as jewels 77 is provided for receiving the pivots 73. The jewels 77 are mounted in members 78 which are adjustably mounted within housings 79 disposed in the case 61.

Electrical contact with each end of the torque coil 21 is established through a coil spring 82 mounted upon the pivot pin 73 and which has one end connected to the truss member 71.

Operation of the embodiment of the sensing assembly shown in FIGURES 7 and 8 incorporated in an accelerometer such as that shown in FIGURE 5 is very similar to that hereinbefore described. As hereinbefore explained, the arrangement in FIGURES 7 and 8 insofar as the torque coil, the pickoff coils, the pendulous element, the magnet assembly, the direction of the magnetic field, the number of turns, etc. is substantially identical to that for the embodiments hereinbefore described. Additional mass, however, has been added to the moving system which, however, can be properly floated or balanced by utilizing the thin wall tube 76 on the pivot axis which acts as a buoyant float to negate the mass of the suspension and thereby move the center of gravity of the whole moving system back to the center of the torque coil which again establishes coincidence for the center of the force and the center of mass of the entire moving system. Thus the linearity and the sensitivity or scale factor of the sensing assembly are unaffected by movement of the pivots in the bearings because of the weight of the suspension is counterbalanced by mass added by the pendulous elements of the moving system.

The arrangement shown provides a very high torque level about the pivot axis because the force is generated at a large radius. Because of this fact the effect of the bearings in production of null offsets is minimized. In addition, the bearing torque provided with the pivotal mounting for the moving system as shown in FIGURES 7 and 8 will contribute only a very small part of the error seen in a conventional system.

Thus from the foregoing it can be seen that when the flexure is used for mounting the torque coil, there is a relatively small lever arm so that there is automatically a very high spring constant which represents a very stiff suspension so that a very minute drift in the electronics will represent a very finite drift in null output of the instrument. With the pivot and bearing arrangement it is possible to utilize the sensing assembly with much lower G levels and to still obtain great accuracy with reliability and low cost. Such an arrangement also substantially improves the achievable dynamic range by a large factor without increase in complexity or cost.

It will be noted that a triangular support system has been provided in FIGURES 7 and 8 for the torque coil 21 through use of members 71 and 73. This has been done so that there is no mode of vibration for the whole moving system which is within a normal range of frequency and in which the sensing assembly is expected to be used. By the use of the tube 76 for supporting the torque coil, it is possible to provide adequate support without any danger of creating spurious modes which may cause difficulty under vibration.

As will be appreciated, it is desirable to have the pendulous mass or paddle as rigidly coupled to the moving system as possible and to have the moving system as rigid as possible so that it will not flex during normal input accelerations. If the moving system flexes, spurious resonances and responses will be obtained within the instrument's range.

In addition to the foregoing advantages, of my sensing assemblies the torque coil itself provides an excellent damping member for damping out cross axis vibrations. Because the accelerometer using my sensing assembly will have a very high loop gain, the accelerometer will in fact be what is termed a "stiff servo" for normal input accelerations, and therefore it is necessary to provide heavy damping fluids to provide reasonable damping on the sensitive axis. This heavy damping fluid will also provide excellent damping for lateral motions about the other two axes other than the pivot or hinge axis.

It is apparent from the foregoing, that I have provided a new accelerometer and sensing assembly therefor which has many desirable characteristics which is particularly adaptable for use in high G and low G applications.

I claim:

1. In an accelerometer, magnetic means having a substantially annular air gap with the magnetic lines of flux passing through the air gap, a substantially circular electromagnetic coil disposed in the air gap, means mounting said coil to permit angular movement of the coil in a pendulous manner in the air gap but serving to prevent cross-axis movement of the coil in directions at right angles to the direction of pendulous movement, a mass connected to said coil and movable with said coil, electrical circuit means including an inductive pick-off element disposed on only one side of the mass for detecting movement of said mass and feedback means connecting said electrical circuit means to the coil for applying current to said coil in proportion to the displacement of the mass, said coil and the mass forming at least a part of a moving system, the center of force exerted by the current in the coil substantially coinciding with the center of gravity of the moving system.

2. An accelerometer as in claim 1 wherein said means for permitting angular movement of said coil includes low friction pivot means and means connecting the low friction pivot means to the coil, said low friction pivot means restricting movement of the coil to movement in a single plane.

3. An accelerometer as in claim 2 wherein said means connecting the low friction pivot means to the coil is connected to the coil at two points spaced approximately 120° apart and wherein said mass is connected to the coil at a point spaced approximately 120° from said two points so that the center of gravity of the moving system is substantially at the center of the coil.

4. In an accelerometer, magnetic means forming a magnetic field, an electromagnetic coil disposed in the magnetic field, flexible means secured to the coil permitting pendulous movement of the coil on a single axis but preventing cross-axis movement of the coil in directions at right angles to the single axis, a mass secured to the coil and movable with the coil, electrical circuit means including an inductive pick-off element disposed adjacent to said mass for detecting movement of said mass, and feedback means connecting the electrical circuit means to the coil for the application of current to said coil in accordance with the displacement of said mass from a neutral position, said coil and said mass forming at least a part of a moving system, said flexible means including at least two spaced apart legs connected to the coil approximately 120° apart and said mass being connected to the coil at a point spaced approximately 120° from said legs so that the center of gravity of the moving system is substantially at the center of the coil.

5. In a sensing assembly for an accelerometer, magnetic means having a substantially annular air gap with the magnectic lines of flux passing through the air gap, a moving system comprising a substantially circular electromagnetic coil disposed in the air gap, means mounting the coil permitting angular pendulous movement of the coil in the air gap, a mass connected to the coil and movable with the coil, and an inductive pick-off means disposed adjacent to the pendulous mass, said means for mounting said coil for angular movement consisting of flexure means formed of a spring-like material secured to the coil and means for rigidly supporting at least one portion of the flexure means, said flexure means also including at least a pair of legs secured to the coil and spaced approximately 120° apart and wherein the mass is secured to the coil at a point spaced substantially 120° from said legs so that the center of gravity is substantially at the center of the moving system.

6. In a sensing assembly for an accelerometer, magnetic means having a substantially annular air gap with the magnetic lines of flux passing through the air gap, a moving system comprising a substantially circular electromagnetic coil disposed in the air gap, means mounting the coil permitting angular pendulous movement of the coil in the air gap, a mass connected to the coil and movable with the coil and inductive pick-off means disposed adjacent to the mass, said means mounting said coil including low friction pivot means and means including rigid truss members connecting the low friction pivot means to the coil, said low friction pivot means also including a cylindrical member, said rigid truss members having ends secured to said cylindrical member and secured to said coil at points on the coil spaced approximately 120° apart, said mass being secured to the coil at a point spaced approximately 120° from the points at which said rigid truss members are secured to the coil so that the center of gravity of the moving system is substantially at the center of the moving system.

7. In a sensing assembly for an accelerameter, magnetic means having a substantially continuous air gap with magnetic lines of flux passing through the air gap, the moving system comprising a continuous hollow electromagnetic coil disposed in the air gap, means mounting the coil permitting angular pendulous movement in the air gap, a mass connected to the coil and movable with the coil, and inductive pick-off means disposed adjacent to the mass, said moving system being positioned so that the center of force exerted by the coil is substantially coincident with the center of gravity of the moving system.

8. In an accelerometer, a body formed of material capable of carrying magnetic lines of flux, said body being formed with a recess therein and having a circular opening communicating with the recess, a magnet mounted in said body, said magnet having a cylindrical portion disposed in said circular opening to form in cooperation with said body an annular air gap having a magnetic field therein, a substantially circular electromagnetic coil disposed in said air gap, a pair of supporting legs mounted on said coil, a pendulous mass mounted on said coil, said pair of supporting legs and said pendulous mass being disposed symmetrically about said coil, said body being formed with recesses and serving to receive said pendulous mass and said supporting legs, means secured to said supporting legs for supporting said coil in said annular air gap and permitting pendulous movement of the coil in the air gap on a single sensitive axis but preventing cross-axis movement of the coil in directions at right angles to said sensitive axis, said support legs and said pendulous mass being mounted on the coil so that the center of gravity of the coil with its pendulous mass and support legs is substantially at the center of the coil, the magnetic field in the air gap being symmetrical with respect to the sensitive axis of the accelerometer, electrical circuit means including an inductive pickoff element disposed adjacent to the pendulous mass for detecting movement of said mass, and feed back means connecting the electrical circuit means to the coil for the application of current to said coil in accordance with the displacement of the pendulous mass from a neutral position.

9. An accelerometer as in claim 8 wherein said means for mounting said pair of support legs includes low friction pivot means.

10. An accelerometer as in claim 8 wherein said means for mounting said support legs includes flexure means formed of a spring-like material.

References Cited
UNITED STATES PATENTS

| | | | |
|---|---|---|---|
| 2,797,912 | 7/1957 | Trostler | 73—516 |
| 2,947,176 | 8/1960 | Perry | 73—517 |
| 2,985,021 | 5/1961 | Lewis et al. | 73—517 |
| 3,071,008 | 1/1963 | Steele | 73—517 X |
| 3,074,279 | 1/1963 | Morris | 73—517 |
| 3,109,310 | 11/1963 | Slater | 73—516 |
| 3,111,036 | 11/1963 | Kistler | 73—517 |
| 3,133,446 | 5/1964 | Cohen | 73—517 |
| 3,152,485 | 10/1964 | Lones et al. | 73—517 |
| 3,153,346 | 10/1964 | Quirmbach | 73—516 XR |

RICHARD C. QUEISSER, *Primary Examiner.*

JAMES J. GILL, *Assistant Examiner.*